United States Patent [19]
Cho

[11] Patent Number: 5,646,613
[45] Date of Patent: Jul. 8, 1997

[54] SYSTEM FOR MINIMIZING AUTOMOBILE COLLISION DAMAGE

[76] Inventor: Myungeun Cho, 13404 Tossa La., Austin, Tex. 78729

[21] Appl. No.: 650,869

[22] Filed: May 20, 1996

[51] Int. Cl.$^6$ .................................................. G08G 1/16
[52] U.S. Cl. .................. 340/903; 340/904; 340/435; 180/167; 180/169; 280/730.2
[58] Field of Search ........................ 340/435, 436, 340/903, 904; 180/167, 169, 274; 280/730 A, 737, 727; 342/70, 72, 380, 200; 367/99, 909

[56] References Cited

U.S. PATENT DOCUMENTS

| | | | |
|---|---|---|---|
| 4,215,878 | 8/1980 | Hirbod | 280/737 |
| 4,528,563 | 7/1985 | Takeuchi | 340/903 |
| 4,694,295 | 9/1987 | Miller | 340/903 |
| 5,106,137 | 4/1992 | Curtis | 293/107 |
| 5,119,901 | 6/1992 | Buie | 340/435 |
| 5,165,497 | 11/1992 | Chi | 180/169 |
| 5,209,519 | 5/1993 | Shiga et al. | 280/728 |
| 5,314,037 | 5/1994 | Shaw et al. | 180/169 |
| 5,324,072 | 6/1994 | Olson et al. | 280/730 A |
| 5,339,075 | 8/1994 | Abst et al. | 340/903 |
| 5,347,273 | 9/1994 | Katiraie | 340/903 |
| 5,357,438 | 10/1994 | Davidian | 364/461 |
| 5,400,864 | 3/1995 | Winner et al. | 180/169 |
| 5,467,072 | 11/1995 | Michael | 340/903 |
| 5,519,377 | 5/1996 | Murphy | 340/435 |

FOREIGN PATENT DOCUMENTS 923604  5/1973  Canada .................................. 343/7

Primary Examiner—Brent A. Swarthout
Assistant Examiner—Van T. Trieu
Attorney, Agent, or Firm—Richard C. Litman

[57] ABSTRACT

A system for minimizing automobile collision damage using radiant energy detectors and externally deployed air bags for aiding in damage reduction of automobile collisions. This system includes radiant energy detectors, such as radars, with transmitters and receivers, a computer, and energy absorbing inflation devices, air bags. Optionally, the system may be adapted to provide warnings and control vehicle functions, such as braking and disengaging the drive train. A dashboard link allows the computer to determine speed, steering and other conditions of the automobile, while the radiant energy detectors provide the computer with information of the object (e.g., another vehicle, pedestrian, or inanimate item) of imminent collision. The computer, using the information provided will determine at what time a ensuing collision will occur, and establish a minimal allowable time window to deploy the inflation device. The inflation device or air bag provides an energy absorbing and diverting buffer between the automobile and the object of imminent collision. The computer uses minimal allowable time window to deploy the air bag automatically, allowing the control of the automobile to remain with the driver such that necessary evasive measures can be taken. Once the imminent collision reaches the minimal allowable time window, the computer initiates a control signal deploying the external air bag. Once deployed, the external air bag reduces the amount of physical damage to the automobile, resulting in less injury, and repair costs.

20 Claims, 7 Drawing Sheets

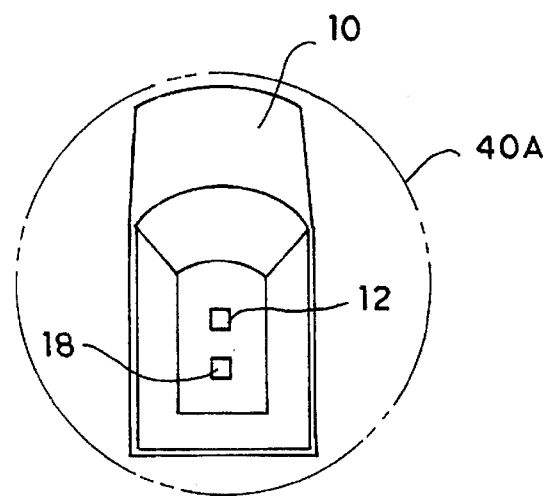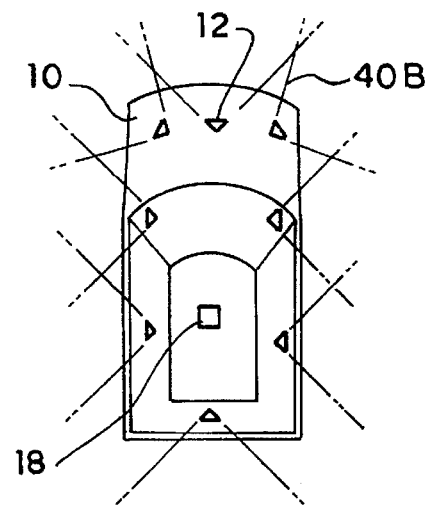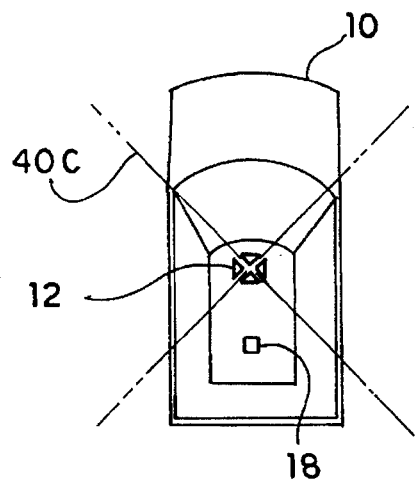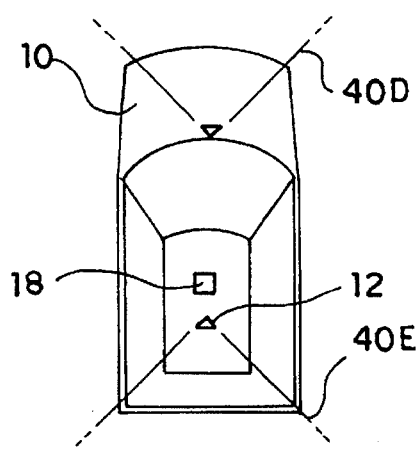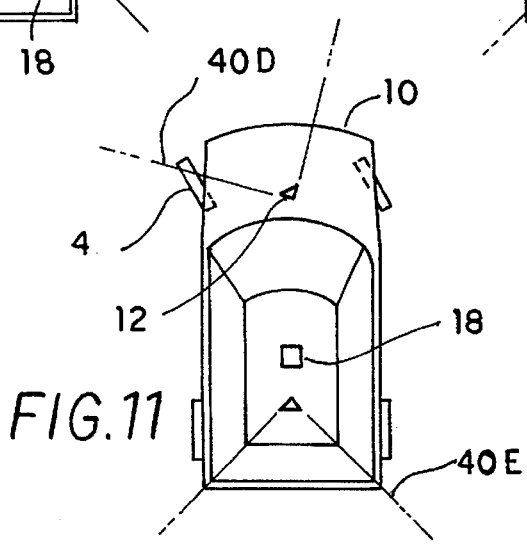

SYSTEM FOR MINIMIZING AUTOMOBILE COLLISION DAMAGE

BACKGROUND OF THE INVENTION

1. Field of the Invention

The present invention relates to a system for minimizing damage to automobiles involved in accidents or collisions. More particularly, the invention relates to a computer processor based system for predicting a collision and deploying an external air bag for protecting a roadway vehicle.

2. Description of the Prior Art

Various schemes have been adopted to protect the passengers of a vehicle from injuries resulting from collisions. On the other hand, no proposals have been made to reduce the cost of repair or replacement of an automobile involved in a collision. Numerous attempts in the art from bumper construction to air bags to vehicular control and warning systems have come about to protect the occupants of the vehicle. Despite this regard for reducing human danger, in most collisions the damage to the vehicle is unmitigated; creating substantial costs for repair or replacement.

A plethora of patents exemplify various automotive devices known for human protection. U.S. Pat. No. 4,215,878, issued Aug. 5, 1980 to Hirbod, discloses an internal air bag deployment system for protecting automobile occupants from injury during an accident. U.S. Pat. No. 5,106,137, issued Apr. 21, 1992 to Curtis, discloses an improved vehicle bumper having, internally of the bumper shell, an air bag for providing additional energy absorption upon impact. U.S. Pat. No. 5,165,497, issued Nov. 24, 1992 to Chi, discloses a system for controlling driving distances. U.S. Pat. No. 5,166,881, issued Nov. 24, 1992 to Akasu, discloses a control apparatus for maintaining a set distance of a vehicle from a leading vehicle. U.S. Pat. No. 5,202,742, issued Apr. 13, 1993 to Frank et al., discloses a vehicle guidance system utilizing laser radar. U.S. Pat. No. 5,209,519, issued May 11, 1993 to Shiga et al., discloses an air bag for protecting the occupants of a vehicle upon impact. U.S. Pat. No. 5,314,037, issued May 24, 1994 to Shaw et al., discloses an automobile collision avoidance system that uses a laser radar and microprocessor for anticipating a collision and warning the driver of the possibility of the accident. Additionally, this patent discloses the control of vehicular functions such as braking. U.S. Pat. No. 5,324,072, issued Jun. 28, 1994 to Olson et al., discloses an air bag for protecting the occupant of an automobile from broadside injury by deploying the air bag from the internal side of the automobile. U.S. Pat. No. 5,332,057, issued Jul. 26, 1994 to Butsuen et al., discloses an automatic vehicular control system for altering the direction and/or speed, ultimately avoiding contact. U.S. Pat. No. 5,357,438, issued Oct. 18, 1994 to Davidian, discloses an anti-collision system for automobiles using a multiplicity of sensors and a computer processor for predicting an accident, and subsequently warning the vehicle operator of the possible danger. U.S. Pat. No. 5,400,864, issued Mar. 28, 1995 to Winner et al., discloses a system and method for controlling vehicle speed for maintaining a set safe distance from a preceding vehicle. U.S. Pat. No. 5,461,357, issued Oct. 24, 1995 to Yoshioka et al., discloses an obstacle detection device for a vehicle, which upon obstacle detection, subsequently controls vehicular functions and emits an alarm warning the operator of the imminent danger. Canadian Patent Doc. No. 923,604, published Mar. 27, 1973 by Lalone et al., discloses a vehicle anti-collision automatic control system for predicting a collision between two vehicles and causing the vehicles to be slowed or stopped, avoiding a collision.

Despite the abundance of such devices, none of the above inventions and patents, taken either singly or in combination, is seen to describe the instant invention as claimed.

SUMMARY OF THE INVENTION

Over the years since the inception of the automobile, many features have been added to enhance its functionality and appearance. For passenger safety, these enhancements range from front seat lap belts to rear seat full shoulder harnesses, and from reinforced frame beams to internal air bags. These enhancements have been instituted while maintaining appealing aesthetic character. For example, body side moldings and matching bumpers protect the vehicle and occupants while providing an attractive appearance to the onlooker. For this reason, maintaining the attractiveness is important. The importance resides in the fact that most of the value of a vehicle is not found in its performance, but rather in its appearance. Consequently, all of the safety features that have been incorporated in today's modern vehicles do well in protecting the occupants of the vehicle, as well as the volatile parts of the vehicle (namely, the engine, gas tank, etc.). It is noted however, that the physical appearance is left to bear the brunt and scars of a collision, thus reducing the main asset governing the value of the vehicle.

The present invention relates to a roadway vehicle equipped with a computer based system for predicting a collision and deploying air bags at an appropriate time for reducing the amount of damage sustained by the vehicle in the accident. The system includes basically, a radiant energy detector, a speed detector, an energy absorbing inflation unit and a central computer processing unit (CPU).

Accordingly, it is a principal object of the invention to provide an automobile with a system to reduce the amount of physical damage resulting from collision.

It is another object of the invention to provide a system that automatically determines the possibility of an accident and initiates damage reducing actions.

It is a further object of the invention to provide a system that automatically deploys air bags externally of the vehicle in the event of an accident thereby preventing major damage to the vehicle.

It is still an additional object of the invention to provide a system that automatically deploys air bags internally of the vehicle bumper in addition to the externally deployed air bags of the vehicle in the event of an accident thereby preventing major damage to the vehicle.

Still another object of the invention is to provide a system that maintains the original aesthetic quality of a vehicle in the event of a collision.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 7, 8, 9, 10 and 11 are top environmental views of alternative radar arrangements of the present invention.

Similar reference characters denote corresponding features consistently throughout the attached drawings.

DETAILED DESCRIPTION OF THE PREFERRED EMBODIMENT

Figure 1:
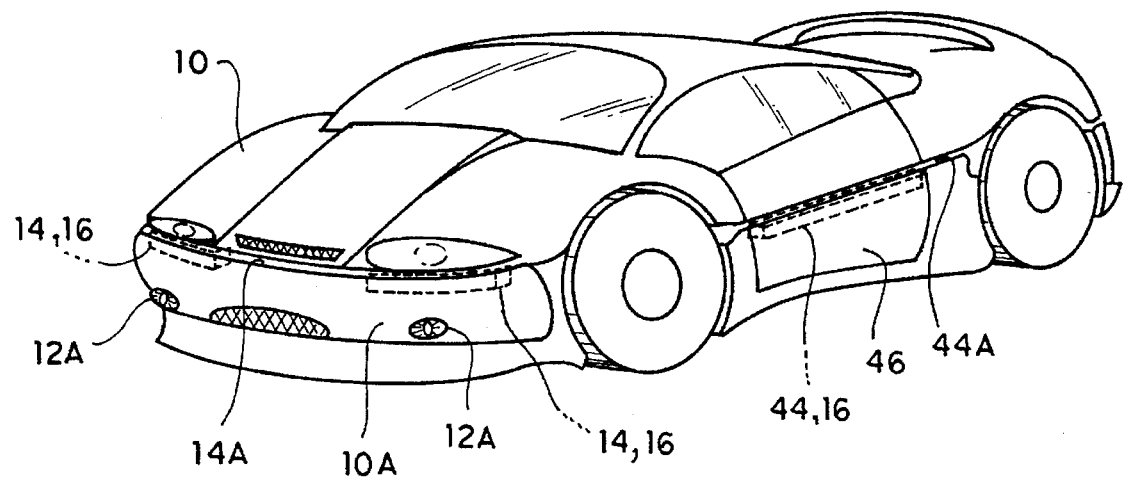
FIGS. 1, and 2 are perspective views of an automobile for comparison views of the air bag of the present invention before and after inflation.

In the preferred embodiment, a roadway vehicle is equipped with a computer based system for predicting a collision and deploying air bags at an appropriate time for reducing the amount of damage sustained by the vehicle in the accident. The system includes basically, a radiant energy detector, a speed detector, an energy absorbing inflation unit and a central computer processing unit (CPU).

The radiant energy detector can be of any known type, such as, ultrasonic, infrared, radar (laser, microwave, etc.), and acoustic detection devices. In the preferred embodiment, laser radar is used because of the more narrow beam width and angular resolution. More importantly, laser radar gives more specific and precise information of detected vehicles or obstacles direction, distance, size and relative speed. One such system may include a radar detection device transmitting and receiving signals at a rate in the range of 1 to 1,000,000,000 samples per second. The data obtained by laser radars (hereinafter, radars) is processed by a computer to determine the time of an imminent collision.

The speed detector of the preferred embodiment provides speed information to the CPU concerning the speed, direction, and other vital information concerning the roadway vehicle. This information gives the CPU the instantaneous parameters of the operation of the vehicle allowing the CPU to predict the time an impact will occur.

The energy absorbing inflation unit, typically an air bag unit, responds to a control signal generated by the CPU. The unit has a volume of inflation gas contained in an inflator. The inflator has an electronically controlled valve that is activated by the CPU, releasing the inflation gas into a puncture resistant air bag. The air bag forms an energy absorbing and diverting buffer between the vehicle equipped as such and the object of collision. The air bag uses high pressure release valves to divert and dissipate the absorbed energy into the atmosphere.

A CPU capable of receiving, and processing input information, and ultimately generating an output signal initiating action is used. Such CPUs are conventional in the art. The CPU, through simple known algorithms, given the necessary speed, distance, and directional data, can predict when an accident or collision is imminent. The CPU, once the prediction has been made, further assesses the time necessary to maximize the protective effect of inflation and generates a control signal to the inflation unit. The time deemed necessary is generally referred to as a minimum allowable time window. As an imminent collision leaves the reactionary control of the driver, the time window is established so that the air bag can inflate to proper size and pressure before impact. The air bags, which are known in the art, are capable of inflation on the order of tenths of a second. Thus, once a collision becomes imminent, unavoidable and inescapable, the CPU will determine the time of impact, set the minimum allowable time window, optionally alert the vehicle operator and send a control signal to the air inflation unit. The control signal will cause the air bag to inflate during the minimum allowable time window, and the inflated air bag will absorb the energies associated with colliding bodies. These energies generally include kinetic, momentum and inertial energies, among others.

Figure 2:
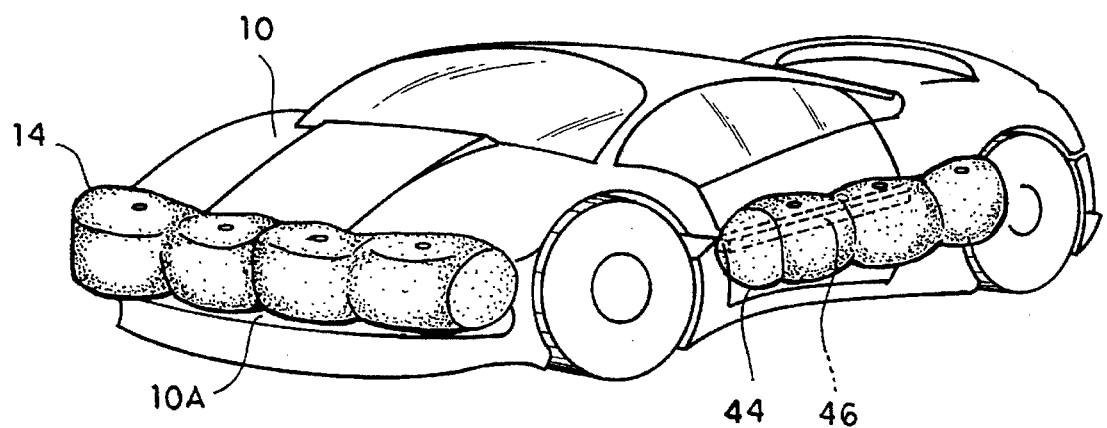

Referring to FIGS. 1 and 2, a roadway vehicle 10 is equipped with the system of the present invention described herein. The system does not interfere with the current level of aesthetic qualities associated with the modern vehicle of today. The exterior of the vehicle 10 has bumpers 10A supporting radar ports 12A and air bag ports 14A. When activated, air bag 14 is inflated through the air bag port 14A, forming the impact buffer between the vehicle 10 and the object of the collision. Mounted in the door panels 46 of vehicle 10 are air bag ports 44A and additional radars 12 and radar ports 12A (note FIG. 14). Upon decision of CPU 18, air bags 44 are deployed through ports 44A, preventing damage to the side of vehicle 10 in a manner similar to that previously described. Greater detail of the system is discussed below and shown in FIGS. 3 and 4.

Figure 3:
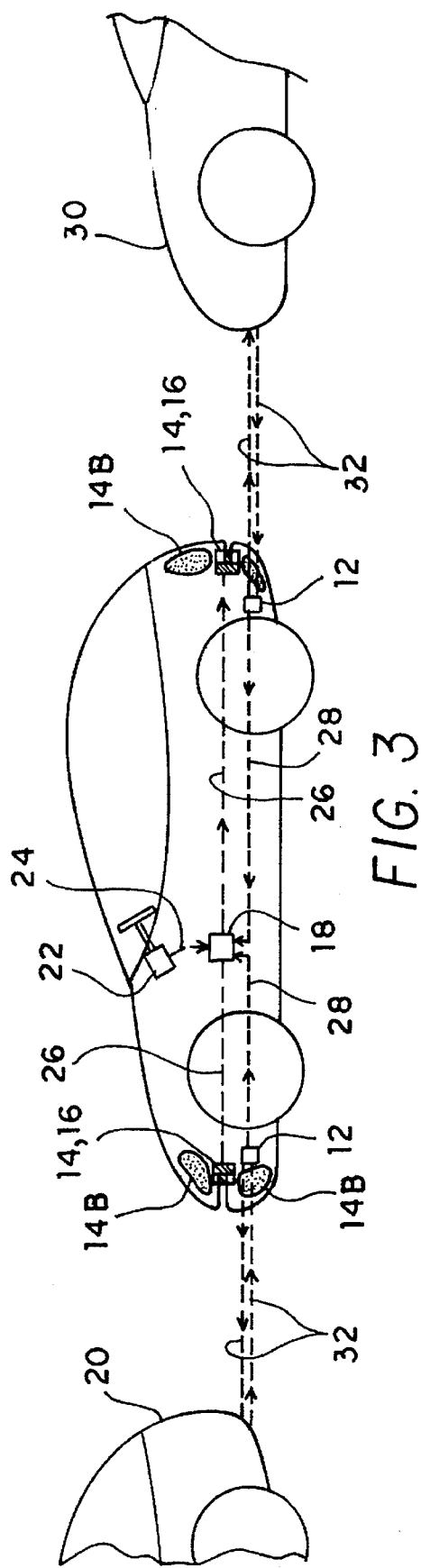
FIGS. 3 and 4 are environmental side views of the system of the present invention in states before and after a collision.
Figure 4:
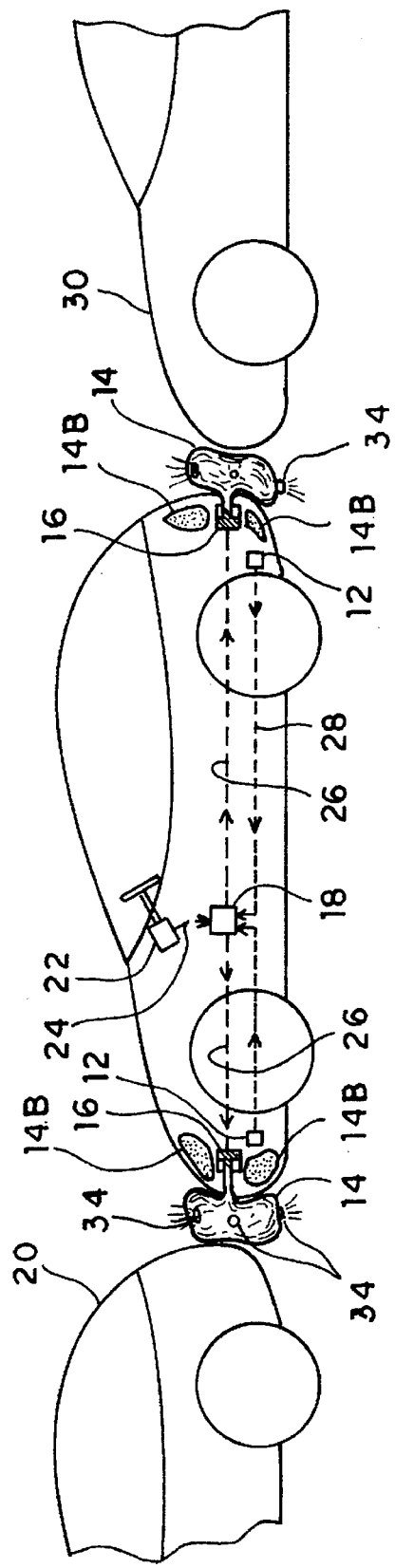

In FIG. 3, the vehicle 10 is in typical traffic road flow. Vehicle 10 is preceded by lead vehicle 20, and succeeded by trailing vehicle 30. The convoy depicted is commonly seen on any roadway, and the speed of each vehicle should be at the appropriate speed limit. Unfortunately, conditions arise that cause disruption in the uniform flow of traffic. For example, while traveling on a high speed roadway, lead vehicle 20 approaches an unexpected road hazard, such as a major pothole. Lead vehicle 20 attempts to slow down or stop. Unfortunately, the vehicles 10 and 30 fail to anticipate the danger ahead of lead vehicle 20.

Vehicle 10, being equipped with the system of the present invention, has a CPU 18 that constantly monitors the traveling parameters of vehicle 10 from the dashboard 22 via dashboard link 24. The dashboard 22 provides speed and direction information. Such information is obtainable in many other facets, such as, wheel speed detection, steering column angle detection, etc.

CPU 18 also receives input signals from radars 12 via data lines 28. Radars 12 transmit and receive information concerning the lead 20 and trailing 30 vehicles via the transmitted and reflected signals 32. The signals 32 are sampled by the CPU 18 at a high rate in order to ensure the minimum allowable time window is satisfactorily set. The signals 32 provide CPU 18 with information relating to the relative distance between vehicle 10 and both lead 20 and trailing 30 vehicles. Also, signals 32 provide CPU 18 with information relating to the speeds of vehicles 20 and 30. With this information CPU 18 calculates the changes in distance, speed and direction of the vehicles 20 and 30 with respect to vehicle 10. CPU 18 is programmed to acknowledge abrupt changes as potential indications of an impending collision.

As lead vehicle 20 suddenly changes speed by braking, radars 12 aboard vehicle 10 detect these changes and submits the information to CPU 18. Likewise, as vehicle 10 begins to brake in response to the braking of vehicle 20, radars 12 detect a relative increase in speed from trailing vehicle 30. CPU 18 alerts the operator of vehicle 10 that a collision involving either or both lead vehicle 20 and trailing vehicle 30. CPU 18 also calculates the time that such collision would occur based upon the instantaneous measurements from dashboard 22 and radars 12. From the time calculation, CPU 18 sets a minimum allowable time window, and generates a control signal based upon the minimum allowable time window. When the collision becomes imminent, unavoidable and inescapable, the control signal is sent from CPU 18 to inflation unit 16 via control lines 26. An electronically controlled valve of inflation unit 16 responds to the control signal from CPU 18, and releases a volume of inflation gas contained in inflation unit 16. The inflation gas fills air bags 14 within tenths of a second, after which the inevitable collision occurs. In addition, supported internally of the bumpers 10A, are several auxiliary air bags 14B. Auxiliary air bags 14B provide impact absorption to the vehicle 10 and bumpers 10A. The, auxiliary air bags 14B remain inflated at all times, giving the bumpers 10A an internal buffer for low speed impacts (e.g., 5 MPH collisions).

Figure 5:
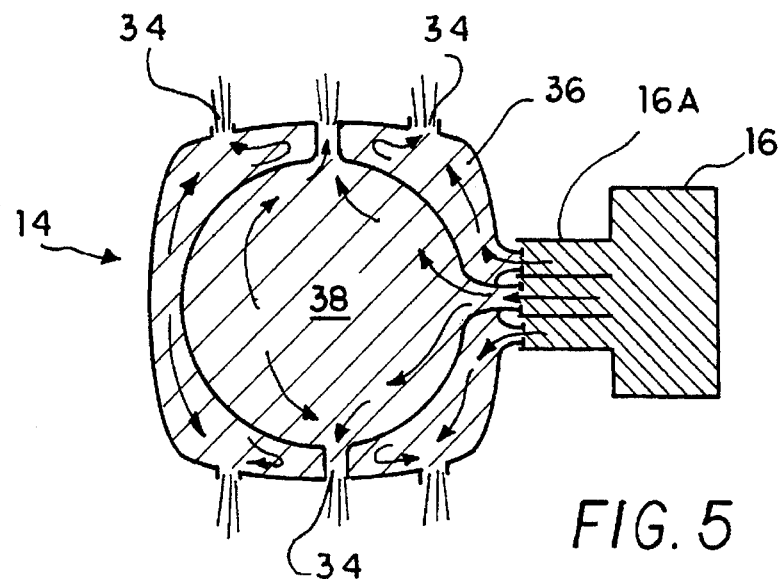
FIGS. 5, 6, and 6A are diagrammatic representations of alternative embodiments of the preferred air bag construction.
Figure 6:
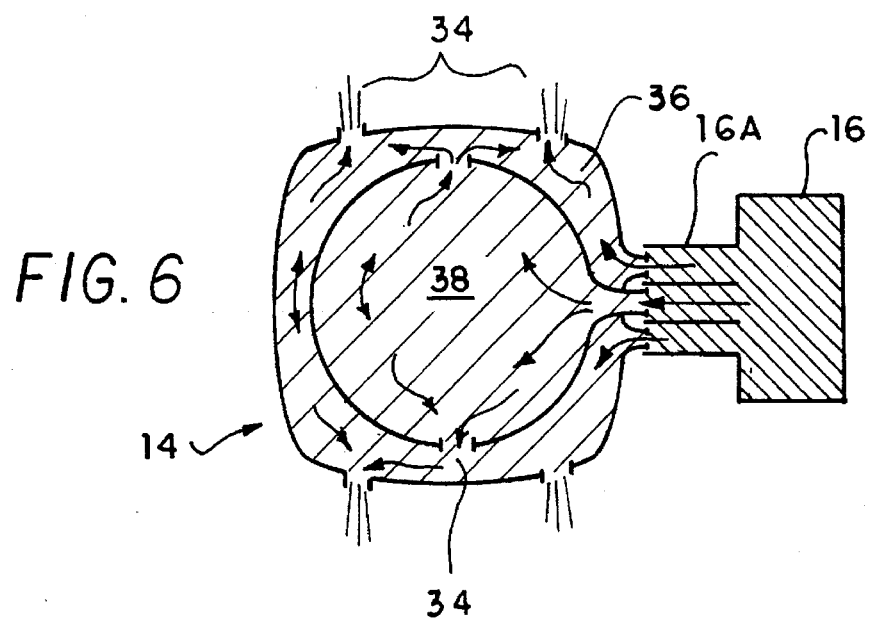
Figure 6A:
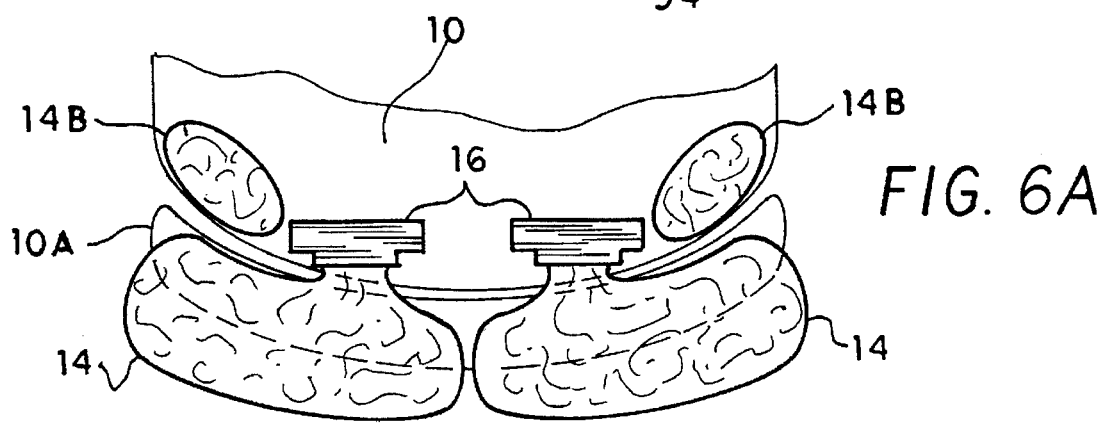

The air bags 14 provide an energy absorbing buffer between the colliding vehicles 20, 10, and 30. As illustrated in FIGS. 5, 6 and 6A, to help absorb the collision energies, air bags 14 convert the absorbed energies into air and gas movement, the air and gas being released through high pressure release ports 34 in the walls of the air bags 14. The high pressure ports divert the energy by releasing the gas from the air bags 14 into the atmosphere. This allows the air bags to absorb the energy, without forcing the gas back into the inflation unit, which otherwise may cause damage to the electronically controlled valve or the vehicle 10. Also, auxiliary air bags 14B provide additional impact absorption to the vehicle 10 and bumpers 10A. Auxiliary air bags 14B remain inflated at all times, giving the bumpers 10A an internal buffer for low speed impacts; and maintaining the aesthetic qualities of the vehicle 10, by maintaining the shape of bumpers 10A.

FIGS. 7-11 illustrate various arrangements for locating radars 12 upon vehicle 10. FIG. 7 shows a vehicle having an omnidirectional radar unit emitting a 360 degree radial beam 40A and receiving its corresponding reflected beam. The radial beam 40A may be emitted in many known ways, such as by rotating radar 12. FIG. 8 illustrates a plurality of radars 12 surrounding the perimeter of the vehicle 10, each radar having an inspection region shown by beams 40B (which may overlap increasing continuous perimeter coverage). FIG. 9 illustrates an arrangement of four radars 12 inspecting quadrant regions by beams 40C. FIGS. 10 and 11 illustrate the forward and rearward detection arrangement of the preferred embodiment; radar 12 located in the front of the vehicle 10 is coupled with the steering mechanism of vehicle 10 so that as the steering wheels turn, the radar unit 12 is correspondingly turned to maintain its beam in a direction generally parallel with the direction of the movement of the vehicle. This results in the forward beam 40D inspecting the vicinity of the turn into which the vehicle 10 embarks. Beam 40E maintains a rearward inspection monitoring abrupt changes in distances of vehicles approaching vehicle 10.

Figure 12A:
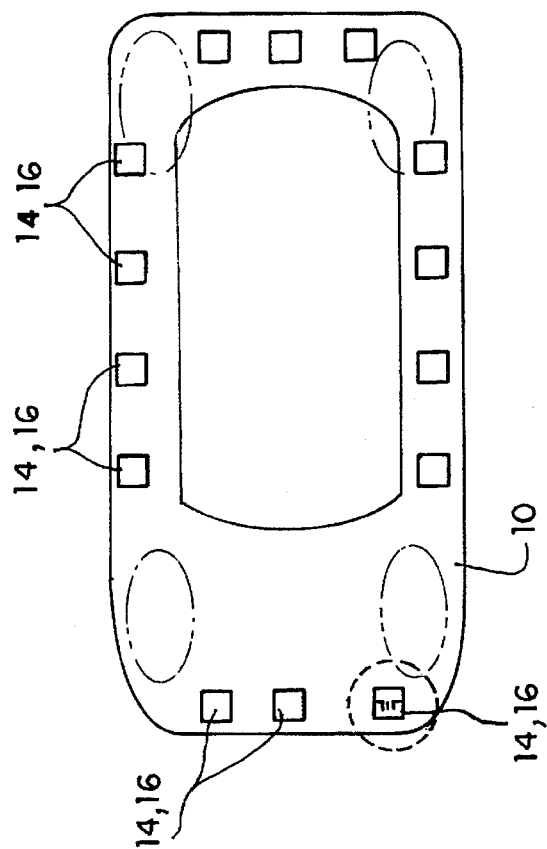
FIG. 12A is a top environmental view of the preferred embodiment of the arrangement of the air bag locations.
Figure 12B:
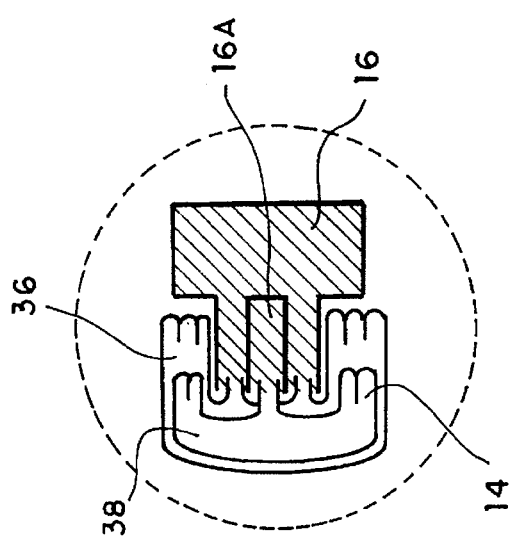
FIG. 12B is an enlarged diagrammatic view of a representative air bag as stored in a vehicle as seen in FIG. 12A.

FIG. 12A illustrates the preferred positional arrangement for the inflation units 16 and air bags 14. Vehicle 10 has a plurality of inflation units 16 and associated air bags 14 positioned around the vehicle. An inflation unit assembly, including inflation unit 16 and air bag 14, is representatively illustrated in detail in FIG. 12B. Inflation unit 16 contains a volume of compressed gas, which contents are controlled by a conventionally known electronically controlled valve represented by 16A. The air bag 14 is shown in a deflated and folded disposition adjacent to the inflation unit 16.

Air bag 14 is shown as having multiple compartments, for example outer compartment 36 and inner compartment 38, which compartments' operation is more clearly shown in FIGS. 5 and 6 as briefly alluded to above. The compartments 36 and 38 form multiple energy absorbing buffers. As seen in FIG. 5, the outer compartment 36 surrounds inner compartment 38. Each of the outer 36 and inner 38 compartments have a plurality of the high pressure release ports 34 for diverting the energy from the colliding bodies to the atmosphere. Alternatively, as seen in FIG. 6, the inner compartment 38 is completely enclosed internally of outer compartment 36. Inner compartment 38 has a plurality of high pressure release ports 34 that release the gas into the outer compartment 36. Outer compartment 36 also has a plurality of high pressure release ports 34 that release the gas to the atmosphere.

The construction of the high pressure release ports may be accomplished using any of numerous conventional means known in the art. For example, the ports 34 may be formed as areas of the air bag 14 that are several mils thinner than the remainder of the air bag 14. Likewise, the ports 34 may include a pneumatic type valve, such that upon impact a valve stem extends from each port through which the internal pressure at impact is forced. It is also conceived that simple stopper type pop out in each port may be provided. However, the stopper should be permanently tethered to the air bag 14 as a projectile safeguard.

Figure 15:
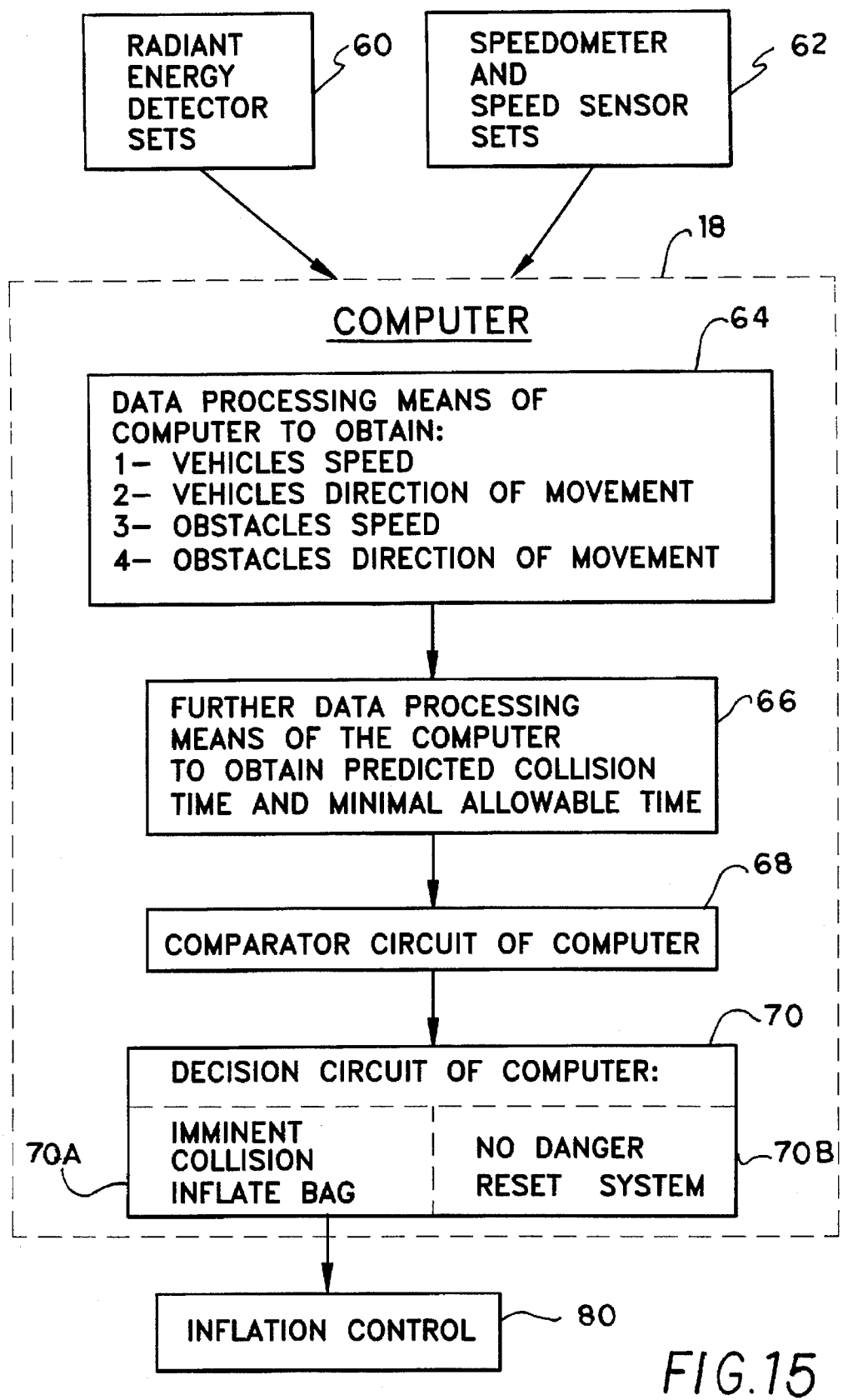
FIG. 15 is a block diagram illustrating the typical flow of the system logic for predicting a collision and deploying the air bags.

The block diagram shown in FIG. 15 provides a complete overview of the functional operation of the system disclosed herein. Block 60, radiant energy detector sets, represents the radars 12. Block 62, speedometer and speed sensor sets, represents the dashboard 22 information collected concerning the traveling parameters of the vehicle 10. CPU 18 is shown incorporating the various processing sequences. Block 64 establishes the data gathering and information preparation of the CPU 18. Block 64 receives the information provided by block 60 and 62 and processes the information into useable data for the CPU 18. From block 64, block 66 uses the gathered and processed data and predicts the time of imminent collision, as well as establishes the minimum allowable time window for instructing the inflation units 16 to deploy the air bags 14. Block 68 represents the means to continuously compare the time period calculated for the imminent collision with the minimum allowable time window; this comparison allows the prediction of imminent collision to be readjusted based upon changes in the traveling parameters, i.e., speed, distance direction, etc., so that if the collision is avoided altogether the air bags will not inflate. The output of block 68 is sent to block 70, a decision block. Block 70 of CPU 18 examines the output of block 68 and, when the minimum allowable time window has been reached, renders a decision whether to deploy the appropriate air bags 14 (sub-block 70A) or, alternatively, to reset the system when the collision has been avoided (sub-block 70B). If the collision becomes inescapable and would result in costly damage or injury, the sub-block 70A issues the control signal on line 26 (FIG. 3). Block 80 receives the signal from CPU 18 instructing the inflation unit 16 to release the controlled valve 16A, and inflate the air bag 14.

Figure 14:
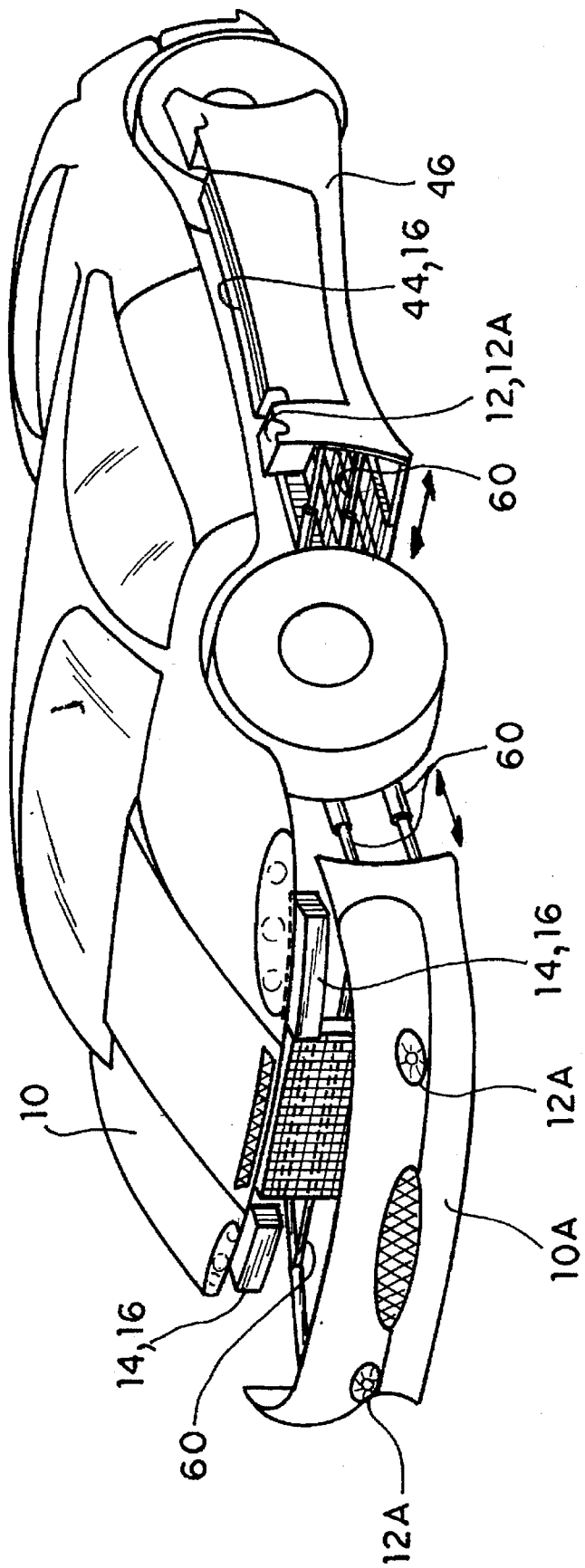
FIG. 14 is a perspective view showing a modular automobile body for returning the deflated, and folded air bag to the automobile after a collision.

FIG. 14 is exemplary of how the system is returned to the interior of the vehicle 10. The system once deployed provides a buffer region resulting in minimal physical damage to the vehicle 10. This results in minimal cost to repair the vehicle 10 after being involved in a collision. After deployment the system would simply require a recharging of the volume of compressed gas in inflation unit 16 and deflation, refolding and repositioning of the air bags 14 in the vehicle 10.

The vehicle 10 has a modular characteristic, in that the bumpers 10A and door panels 46 are supported on rails 60. These rails 60 allow the bumpers 10A and door panels 46 to slide out and away from the vehicle 10, like drawers. Once in the open position, the deflated and refolded air bags are replaced internally of the vehicle and the bumpers 10A and door panels 46 are returned to the vehicle. Since the amount of damage would be minimal, even at higher velocities, the aesthetic quality of vehicle 10 is preserved. It should be noted that the main purpose of the invention is to reduce the physical damage of the vehicle although the invention also protects the occupants of the vehicle from extreme injury because the force exerted on the occupants of vehicle 10 due to impact is greatly reduced by the system of the present invention.

Figure 13:
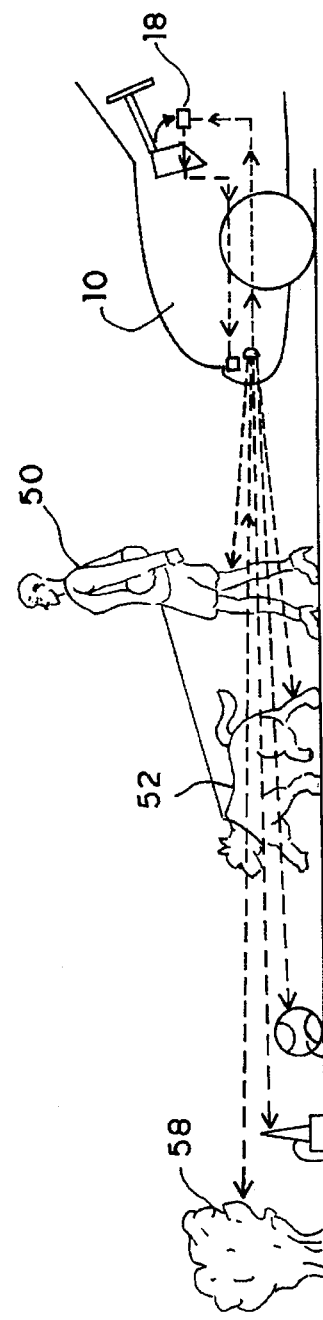
FIG. 13 is an environmental view illustrating the system predicting collision with other obstacles.

Additionally, the invention serves to minimize damage to other non-moving vehicle obstacles. For example, as best seen in FIG. 13, the radars 12 function also to detect pedestrians 50, animals 52, inanimate objects (such as balls 54, pylons, cones, flags, barricades 56, etc.), and plants or trees 58. In addition, the system may detect walls, guardrails, and utility poles. Once the CPU 18 gathers the information and determines the minimum allowable time window, usually on the order of a tenth of a second before apparent impact, the deployment of the air bags 14 reduces the amount of costly damage and injury.

It is to be understood that the present invention is not limited to the sole embodiment described above, but encompasses any and all embodiments within the scope of the following claims.

I claim:

1. A collision damage minimizing system for a roadway vehicle comprising:

means for generating instantaneous speed signals of the roadway vehicle;

at least one radiant energy detection unit mounted on the roadway vehicle, each said at least one radiant energy detection unit including transmitter means for transmitting signals of radiant energy, and highly directional receiver means for receiving signals of radiant energy reflected by a potential obstacle and generating an electronic signal in response thereto;

a computer processing unit (CPU) for receiving said speed signals and said electronic signals from said radiant detection unit, said CPU continuously processing information derived from said electronic and speed signals, said CPU calculating changes in distance, speed and direction of the potential obstacle with respect to the roadway vehicle, said CPU generating a control signal upon calculation that a collision is imminent based on said calculated changes; and at least one energy absorbing inflation device responsive to said control signal, said energy absorbing inflation device including means for producing inflation gas, an electronically controlled valve for releasing said inflation gas, and an air bag coupled to said valve for inflation upon receiving said inflation gas, said air bag being deflated, folded and positioned internally of the roadway vehicle prior to inflation, and said air bag being positioned externally of the roadway vehicle upon inflation; whereby said air bag upon inflation absorbs kinetic, momentum and inertial energies at collision thereby minimizing damage to the roadway vehicle.

2. The system according to claim 1, said radiant energy detection unit is selected from the group consisting essentially of ultrasonic, infrared, radar, and acoustic detection devices.

3. The system according to claim 2, said radiant energy detection unit is a radar detection device.

4. The system according to claim 3, said radar detection device transmits and receives signals at a rate in the range of 1 to 1,000,000,000 samples per second.

5. The system according to claim 1 wherein said air bag includes multiple compartments for receiving said inflation gas; and said electronically controlled valve has multiple ports; wherein each compartment of said air bag is coupled respectively to a corresponding port of said electronically controlled valve.

6. The system according to claim 5, said air bag comprising at least an inner compartment and an outer compartment, wherein said outer compartment encloses, on an inner periphery, the outer periphery of said inner compartment.

7. The system according to claim 6, including high pressure gas release ports in each compartment for releasing the inflation gas to the atmosphere so that the destructive energy of the imminent collision is redirected as forced gas into the atmosphere.

8. The system according to claim 7, said ports of said inner compartment release said inflation gas into said outer compartment while said ports of said outer compartment release said inflation gas into the atmosphere.

9. The system according to claim 7, said ports of said inner compartment and said outer compartment release said inflation gas directly into the atmosphere.

10. The system according to claim 3, said radar detection device being positioned in the vehicle so that imminent collisions are predicted in all directions.

11. The system according to claim 10, said radar detection device is an omnidirectional radar element providing a coverage region of 360° about the vehicle.

12. The system according to claim 10, said radar detection device is a unidirectional radar element, wherein a plurality of said radar elements are positioned around the perimeter of the vehicle.

13. The system according to claim 12, a plurality of at least two radar elements are provided.

14. The system according to claim 13, a plurality of at least four radar elements are provided.

15. The system according to claim 10, said radar detection device is adapted for rotation in a manner that aligns said radar element with the direction of the steering wheels of the vehicle.

16. The system according to claim 6, a plurality of said energy absorbing inflation devices disposed around the perimeter of the vehicle, said CPU operable to selectively control each device independently, thus minimizing damage to the vehicle regardless of the direction of the imminent collision.

17. A collision damage minimizing system for a roadway vehicle comprising:

means for generating instantaneous speed and steering signals of the roadway vehicle;

at least one radar unit mounted on the roadway vehicle, each said at least one radar unit including transmitter means for transmitting signals of radar energy, and highly directional receiver means for receiving signals of radar energy reflected by a potential obstacle and generating an electronic signal in response thereto;

means for receiving said instantaneous speed and steering signals of the roadway vehicle and said electronic signals from said at least one radar unit and for converting said received signals into data bit information;

means for processing said data bit information to obtain roadway vehicle speed, distance between the roadway vehicle and the potential obstacle, real and relative speed of the potential obstacle, real and relative direction of the potential obstacle, change in relative speed of the roadway vehicle and the potential obstacle, and relative directions of movement of the roadway vehicle and the potential obstacle;

means for determining apparent time of imminent collision and establishing an allowable time window for preventive action prior to the apparent time of imminent collision;

means for determining when the established time window has been reached;

means for initiating a control signal during the established time window; and at least one energy absorbing inflation device responsive to said control signal, said energy absorbing inflation device including means for producing inflation gas, an electronically controlled valve for releasing said inflation gas, and an air bag coupled to said valve for inflation upon receiving said inflation gas, said air bag comprising at least an inner compartment and an outer compartment said outer compartment enclosing, on an inner periphery, the outer periphery of said inner compartment, said air bag being deflated, folded and positioned internally of the roadway vehicle prior to inflation said air bag being positioned externally of the roadway vehicle upon inflation;

wherein said air bag upon inflation absorbs kinetic, momentum and inertial energies at collision thereby minimizing damage to the vehicle.

18. The system according to claim 17, further comprising permanently inflated auxiliary air bags positioned internally of the vehicle, for providing additional durability and shock absorption.

19. A collision damage minimizing system for a roadway vehicle comprising:

means for generating instantaneous speed and steering signals of the roadway vehicle;

a plurality of radar units mounted on the roadway vehicle for providing omnidirectional detection around the perimeter of the vehicle, said plurality of radar units each including transmitter means for transmitting signals of radar energy, and highly directional receiver means for receiving signals of radar energy reflected by a potential obstacle and generating an electronic signal in response thereto;

means for receiving said instantaneous speed and steering signals of the roadway vehicle and said electronic signals from said radar units and for converting said received signals into data bit information;

means for processing said data bit information to obtain roadway vehicle speed, distance between the roadway vehicle and the potential obstacle, real and relative speed of the potential obstacle, real and relative direction the potential obstacle, change in relative speed of the roadway vehicle and the potential obstacle, and relative directions of movement of the roadway vehicle and the potential obstacle;

means for determining apparent time of imminent collision and establishing an allowable time window for preventive action prior to the apparent time of imminent collision;

means for determining when the established time window has been reached;

means for initiating a control signal during the established time window; and at least one energy absorbing inflation device responsive to said control signal, said energy absorbing inflation device including means for producing inflation gas, an electronically controlled valve for releasing said inflation gas, and an air bag coupled to said valve for inflation upon receiving said inflation gas, said air bag comprising at least an inner compartment and an outer compartment, said outer compartment enclosing, on an inner periphery, the outer periphery of said inner compartment, said air bag being deflated, folded and positioned internally of the roadway vehicle prior to inflation, and said air bag being positioned externally of the roadway vehicle upon inflation;

wherein said air bag upon inflation absorbs kinetic, momentum and inertial energies at collision thereby minimizing damage to the vehicle.

20. The system according to claim 19, further comprising permanently inflated auxiliary air bags positioned internally of the bumpers of the vehicle, for providing additional durability and shock absorption.

* * * * *